FUEL SUBASSEMBLY FOR A LIQUID-METAL-COOLED, FAST BREEDER NUCLEAR REACTOR
Filed April 16, 1968
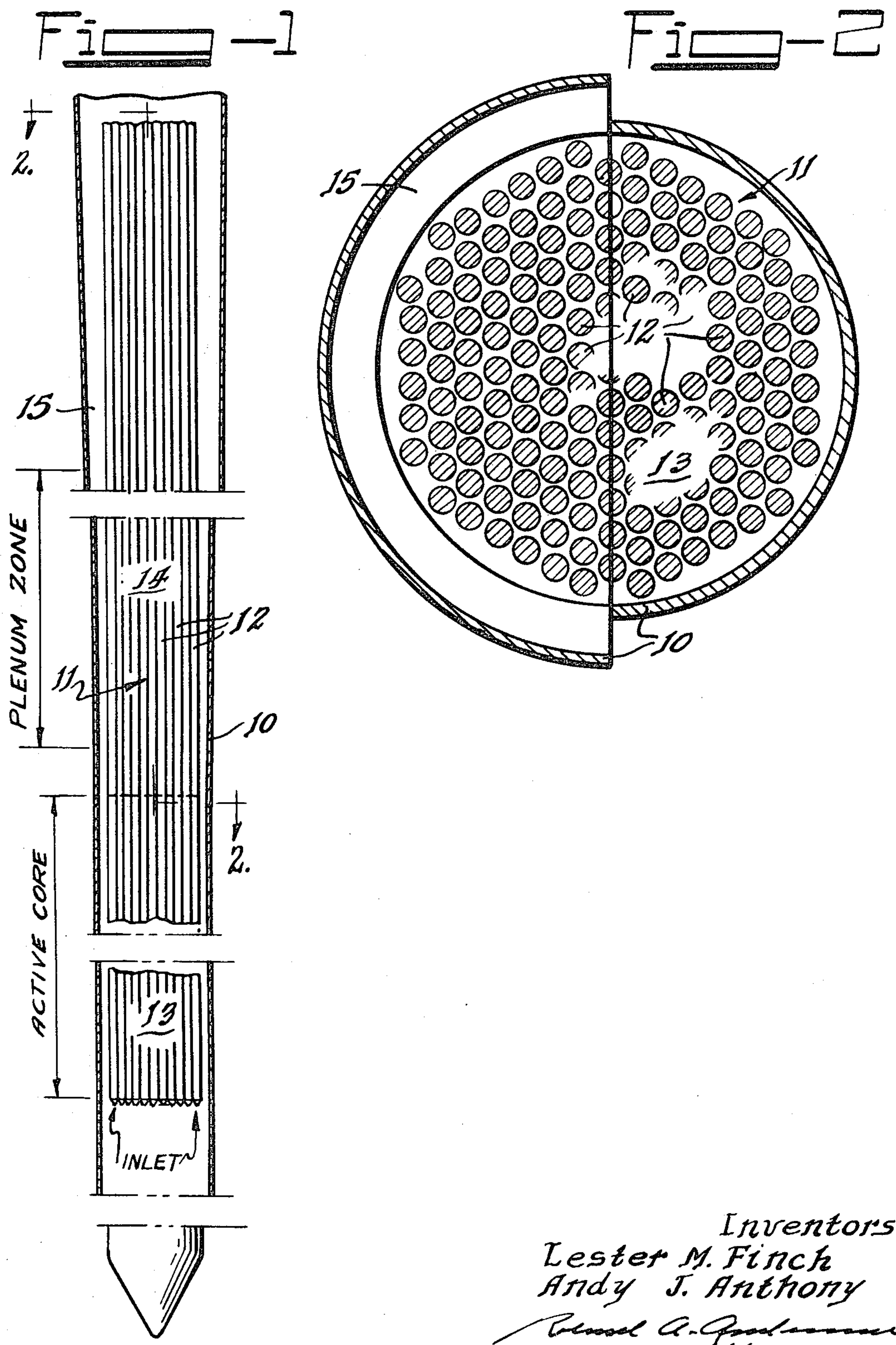
Inventors
Lester M. Finch
Andy J. Anthony
Attorney United States Patent Office 3,468,757

Patented Sept. 23, 1969

3,468,757

FUEL SUBASSEMBLY FOR A LIQUID-METAL-COOLED, FAST BREEDER NUCLEAR REACTOR

Lester M. Finch and Andy J. Anthony, Pasco, Wash., assignors to the United States of America as represented by the Secretary of the United States Atomic Energy Commission Filed Apr. 16, 1968, Ser. No. 721,738
Int. Cl. G21c *3/30*
U.S. Cl. 176—78 1 Claim

ABSTRACT OF THE DISCLOSURE

A fuel subassembly for a liquid-metal-cooled nuclear reactor operating predominantly on fast neutrons includes a compact bundle of elongated fuel pins disposed within a shroud. The subassembly contains an active core and a fission-gas plenum zone downstream of the fuel and the shroud is of expanding cross section downstream of the active core to provide an annular coolant passageway of increasing cross section.

Contractual origin of the invention

The invention described herein was made in the course of, or under, a contract with the United States Atomic Energy Commission.

Background of the invention

This invention relates to a fuel subassembly for a liquid-metal-cooled fast reactor. In more detail the invention relates to a fast reactor fuel subassembly designed to provide minimum resistance to the flow of liquid metal coolant therethrough.

Fuel subassemblies for liquid-metal-cooled fast reactors conventionally consist of a compact bundle of elongated small-diameter fuel pins enclosed within a shroud. For a large fast reactor such as the Fast Flux Test Facility—described in reports No. BNWL–501 and BNWL–SA–978, available from the Clearinghouse for Federal Scientific and Technical Information, U.S. Department of Commerce, Springfield, Va., and in patent application Ser. No. 718,685, filed Apr. 4, 1968 the fuel pins must be very long to accommodate nuclear fuel, neutron reflector or blanket material and a plenum to accommodate fission gases evolved in the fuel. This plenum serves as an accumulation reservoir for fission gases evolved in the fuel.

In general, the amount of fission gas which may be contained in the gas plenum is a function of the gas temperature, the plenum volume, and the strength of the clad "vessel." Since the amount of fission gas released is a function of the fissile fuel burnup, it is desirable to allow large fission gas accumulations in order to obtain equivalent high burnup. Plenum length is the only design variable immediately at hand for increasing fission gas accumulation, since temperature is established by reactor operating conditions and clad strength is determined by available material properties. The obvious consequence of increased plenum and pin length is an increase in coolant pressure drop occasioned by the extra frictional surface resistance of the fuel bundle. Preliminary studies indicate that plenum chamber lengths will range from two feet to ten feet over temperature ranges of 800° F. to 1200° F., respectively. These lengths result from very modest burnup allowances (less than 50,000 MWD/T) and are expected to increase for greater fuel burnup. The typical coolant pressure drop through a high performance fast breeder fuel bundle is about 20 p.s.i. per foot of pin length. Fast breeder fuel pins typically have an active fuel length of three to four feet. It is apparent that a fuel assembly with closed fission-gas-accumulation chambers which require the coolant to maintain coolant velocities through the plenum zone equal to velocities in the fuel zone will exhibit coolant pressure drops from two to five times the pressure loss in the active fuel zone. Not only do these conditions dictate the use of piping capable of withstanding the resulting high stresses, but requirements for pumps may transcend the limits of present technology.

Most of the production designs for fast breeder fuels show a preferred fuel bundle arrangement wherein fuel is arranged in a regular lattice of vertical, prismatic subassemblies with parallel axes. Since the cross section area of such a reactor core is constant throughout its height, there is no possibility for lateral diversion of coolant to reduce the excess coolant pressure drop developed by gas plenum frictional resistance. However, there is a class of dispersed fast reactor cores which provide an expanding array of fuel bundles in approximately vertical orientation. The Fast Flux Test Facility mentioned above is of this class and it is to reactors of this class that this invention relates.

It is accordingly the object of the present invention to develop a fuel subassembly for a fast reactor in which resistance to coolant flow is minimized while retaining the necessary compaction of the fuel bundle.

It is a more detailed object of the present invention to develop a low pressure loss subassembly for a reactor which contains an expanding array of fuel bundles disposed in approximately vertical orientation.

Summary of the invention

These and other objects of the present invention are attained in a fuel subassembly including a bundle of tightly packed elongated fuel pins and a shroud enclosing said pins, said fuel pins including an elongated gas plenum downstream of the fuel, and said shroud being closely disposed around the fuel pins within the active core and expanding gradually in cross section downstream of the active core to provide an annular coolant passage of increasing cross section. This design provides an essentially constant coolant pressure loss independent of the length of gas plenum in the fuel bundle. This constant pressure drop characteristic is obtained by diversion of coolant flow from the high resistance pin bundle region into an annular coolant passage immediately downstream of the fueled zone. The annular coolant flow passage results from enlargement of the coolant conduit enclosing fuel subassembly. Conduit enlargement is possible because of the dispersed geometry of the core assembly which allows the individual annular coolant passage to be increased in diameter proportionate to distance from the core center.

It will be appreciated that this invention can only be employed in a dispersed core reactor such as is the Fast Flux Reactor wherein inclination of the fuel subassemblies provides room for an expanding annular coolant channel.

Brief description of the drawing

The invention will next be described in connection with the accompanying drawing wherein:

FIG. 1 is a diagrammatic vertical section of a fuel subassembly constructed in accordance with the present invention, and FIG. 2 is a horizontal section thereof taken on the line 2—2 in FIG. 1.

Description of the preferred embodiment

As shown, a fuel subassembly constructed in accordance with the present invention comprises a shroud 10 enclosing a compact bundle 11 of elongated fuel pins 12. Coolant enters shroud 10 at the bottom, flows upwardly past fuel pins 12, and leaves shroud 10 at the top. The fuel subassembly includes an active core 13 and a fission-gas plenum zone 14 downstream of the active core.

Shroud 10 is of expanding cross section downstream of the active core to provide an annular coolant passageway 15 of increasing cross section.

As the coolant enters fuel bundle 11 the coolant velocity is increased and held essentially constant for the passage through active core 13. Above active core 13, the coolant velocity decreases due to expansion of the coolant channel; this may be to 40% of the velocity in the active portion and the corresponding frictional resistance per unit length of channel may be reduced to less than 20%.

For one specific embodiment, the over-all length of the fuel subassembly is 76 inches, the length of the active portion is 36 inches, the length of the plenum is 25 inches and the diameter of the shroud in active portion 13 is 4.135 inches O.D. Expansion of the shroud 10 begins 2 inches above the top of the active portion 13 and the shrouds expand from 4.135 inches in outer diameter to 5 inches O.D. in the space of 40 inches. These sizes are specific for fuel subassemblies employed in a 2¾° skewed array.

The invention, of course, applies as well regardless of the cross-sectional shape of the shroud; it can, of course, be circular, square or hexagonal, for example.

It will be understood that the invention is not to be limited to the details given herein but that it may be modified within the scope of the appended claim.

The embodiments of the invention in which an exclusive property or privilege is claimed are defined as follows:

1. A fuel subassembly for a liquid-metal-cooled nuclear reactor operating predominantly on fast neutrons including an active core and a fission-gas plenum zone downstream of said core, said subassembly comprising a compact bundle of parallel elongated cylindrical fuel pins disposed within a shroud, said shroud being of uniform cross section within the active core and of expanding cross section downstream of the active core within the fission-gas plenum zone to provide an annular coolant passageway of increasing cross section downstream of said active core.

References Cited

UNITED STATES PATENTS

| | | | |
|---|---|---|---|
| 3,235,463 | 2/1966 | Sankovich | 176—78 X |
| 3,398,050 | 8/1968 | Yevick et al. | 176—30 X |

FOREIGN PATENTS

| | | |
|---|---|---|
| 637,005 | 2/1962 | Canada. |

CARL D. QUARFORTH, Primary Examiner

MELVIN J. SCOLNICK, Assistant Examiner

U.S. Cl. X.R.

176—40, 87